(12) United States Patent
Schulte et al.

(10) Patent No.: US 7,596,926 B2
(45) Date of Patent: Oct. 6, 2009

(54) DEVICE FOR PRODUCING AND PALLETING PACKAGING BOXES

(75) Inventors: Josef Schulte, Aschendorf (DE); Andreas Prahm, Barssel (DE); Horst Guss, Luttum (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 228 days.

(21) Appl. No.: 10/598,376

(22) PCT Filed: Feb. 16, 2005

(86) PCT No.: PCT/EP2005/001530

§ 371 (c)(1),
(2), (4) Date: Aug. 25, 2006

(87) PCT Pub. No.: WO2005/080239

PCT Pub. Date: Sep. 1, 2005

(65) Prior Publication Data

US 2008/0229708 A1    Sep. 25, 2008

(30) Foreign Application Priority Data

Feb. 25, 2004   (DE) .................. 10 2004 009 584

(51) Int. Cl.
*B65B 17/00*  (2006.01)
(52) U.S. Cl. .............. 53/167; 53/540; 53/245; 414/792; 414/792.1; 414/793
(58) Field of Classification Search ........... 53/167, 53/540, 245, 579, 566, 251; 414/792, 792.1, 414/793
See application file for complete search history.

(56) References Cited

U.S. PATENT DOCUMENTS

| 3,094,225 | A |   | 6/1963  | Repasky et al. |
|-----------|---|---|---------|----------------|
| 4,566,836 | A |   | 1/1986  | Berger et al. |
| 4,951,445 | A | * | 8/1990  | Thibault ............... 53/167 |
| 5,005,335 | A | * | 4/1991  | Yourgalite et al. ......... 53/399 |
| 5,426,921 | A | * | 6/1995  | Beckmann ............... 53/566 |
| 5,450,708 | A | * | 9/1995  | Lashyro ............... 53/399 |
| 5,469,687 | A | * | 11/1995 | Olson ............... 53/48.1 |
| 5,636,966 | A | * | 6/1997  | Lyon et al. ........... 414/791.6 |
| 6,290,448 | B1|   | 9/2001  | Focke et al. |
| 6,477,819 | B1|   | 11/2002 | Focke et al. |
| 7,143,567 | B2| * | 12/2006 | Omo et al. ............... 53/443 |

FOREIGN PATENT DOCUMENTS

| CN | 1113423  | A  | 12/1995 |
| CN | 2379399  | Y  | 5/2000  |
| DE | 39 06 922| C2 | 12/1992 |
| DE | 42 24 232| A1 | 1/1993  |
| EP | 639 503  | A1 | 2/1995  |
| EP | 949 169  | A1 | 10/1999 |
| EP | 1 067 060| A2 | 1/2001  |
| EP | 1 378 472| A1 | 1/2004  |
| GB | 2123378  | A  | 2/1984  |

* cited by examiner

*Primary Examiner*—Hemant M Desai
(74) *Attorney, Agent, or Firm*—Sughrue Mion, PLLC

(57) ABSTRACT

For the dispatch-ready packing of, in particular, cigarette packs or cigarette bundle packs (12), a device is provided, in which the box packer (14) and the palleting station (29) are combined, in order to introduce the bundle packs (12) into boxes (10) and to deposit the latter on pallets (11). The structurally combined units form an overall device which can be operated jointly.

1 Claim, 4 Drawing Sheets

DEVICE FOR PRODUCING AND PALLETING PACKAGING BOXES

This Application is the U.S. national phase of International Application No. PCT/EP2005/001530, filed on Feb. 16, 2005, which claims priority to German Application No. 10 2004 009 584.1, filed on Feb. 25, 2004.

BACKGROUND OF THE INVENTION

The invention relates to a device for producing large packs having a plurality of objects as pack contents, in particular folded boxes for cigarette bundle packs, the objects or bundle packs being fed to a box packer and, with the formation of a pack group as box contents, it being possible to introduce them into the folded box and it being possible to feed the filled and closed folded boxes to a palleting station for transfer to a pallet.

For the dispatch of cigarette packs, bundle packs, what are known as cigarette cartons, are usually formed and these are introduced into a larger packing container, namely into a folded box. The closed folded boxes are then placed on pallets by a palletizer for transport. Firstly the box packer and secondly the palletizer form the independent technical units which have previously been separated spatially from one another. EP 1 067 050 A2 shows one example for a box packer. In the exemplary embodiment according to EP 0 949 169 A1, the finished packs are fed to a palletizer via relatively long conveying tracks, in particular on roller tracks.

SUMMARY OF THE INVENTION

The invention is based on the object of improving the construction and mode of operation of a device for producing, in particular, box packs for cigarettes and for palleting the latter, with regard to construction and mode of operation.

In order to achieve this object, the device according to the invention is distinguished by the fact that the box packer and the palleting station or palletizer form one technical unit, the box packer being arranged directly in front of the palleting station.

Accordingly, according to the invention, the units which were previously separated structurally and functionally for producing the box packs and for loading pallets are combined to form a common device, the former forming one unit in structural and control technology terms. A portal robot which takes the boxes from a depositing position and deposits them on a pallet by transverse displacement is used in the region of the palleting station. As an alternative, boxes can be transported beyond the depositing position past the pallet.

Further special features of the invention relate to the relative position of the individual assemblies with respect to one another, namely an L-shaped or U-shaped layout and the configuration of the palletizer.

BRIEF DESCRIPTION OF THE DRAWINGS

One exemplary embodiment of the device according to the invention will be described in greater detail in the following text using the drawings, in which.

DETAILED DESCRIPTION OF INVENTION

Figure 1:
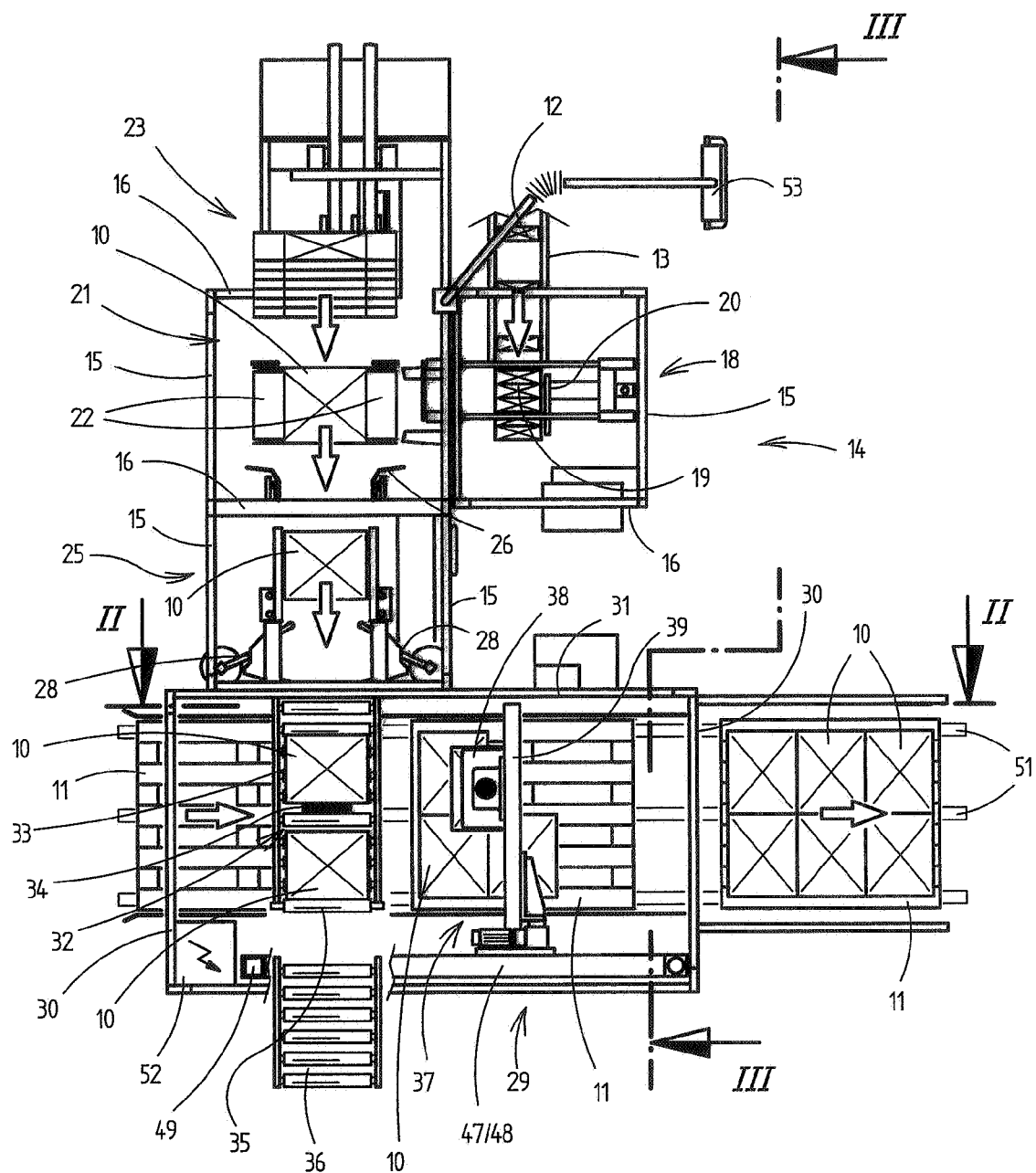
FIG. 1 shows the apparatus for producing and palletizing box packs, in basic outline.

One object of the exemplary embodiment in the drawings is the production of large packs for cigarettes, namely boxes 10, and the provision of the latter for dispatch by arranging a plurality of boxes 10 on the pallet 11.

The contents of the boxes 10 are bundle packs 12 for cigarettes, what are known as cigarette cartons. In practice, the bundle packs 12 are delivered on a feed conveyor 13 coming from a bundle packer. The bundle packs 12 pass through the latter into the region of a box packer 14. The latter comprises a plurality of units which are combined structurally, to be precise by carrying frames comprising longitudinal carriers 15, crossmembers 16 and vertical supports 17. A first unit in the functional sequence is a grouping station 18. The feed conveyor 13 opens into the region of the former. A pack group 19 is assembled from the bundle packs 12. Said pack group 19, as the contents of a box 10, is pushed by a slide 20 out of the region of the grouping station 18 into a packing station 21.

A partially folded box 10 which is assembled into a three-dimensional shape is provided in the packing station 21, to be precise with one open side oriented toward the grouping station 18. Folding tabs 22 of the box 10 are situated in the unfolded, open position, with the result that the pack group 19 can be inserted as a unit into the box 10 which is folded in the manner of a sleeve.

A blank magazine 23 is part of the packing station 21. Said blank magazine 23 comprises a plurality of blanks for boxes 10, which blanks are folded flat and are provided as a folded tube. One after another, the blanks are removed from the blank magazine 23, assembled and made available in the manner shown in the packing station 21.

After a pack group 19 has been introduced into the box 10, the latter is conveyed out of the packing station 21 by a conveyor 24 into the region of a closing station 25. On the transport path, the folding tabs 22 are folded over by folding members 26, to be precise into closing planes of the box 10 which are oriented laterally. In the closing station 25, the folding tabs 22 are fixed in the closed position, in the present exemplary embodiment by adhesive tapes 27 which are applied to the adjacent folding tabs 22 by tape guides 28 which are attached on both sides of the movement path of the boxes 10. The boxes 10 are then filled and closed, and can therefore be dispatched.

After the packing station 21 and after the closing station 25, the boxes 10 are introduced into a palleting station 29. The latter forms a technical unit with the packing station 21 and/or the closing station 25. A carrying frame comprising longitudinal carriers 30 and crossmembers 31 is connected to the correspondingly configured carrying frame of the adjacent unit.

The boxes 10 which come from the closing station 25 are conveyed onto a box receptacle 32 and deposited here. The box receptacle 32 comprises a conveyor, to be precise a section of a roller track 33. The latter is configured in such a way that a plurality of, namely (at least) two, boxes 10 can be made available on the box receptacle 32 following one another in the conveying direction. The position of the two boxes 10 is determined by stops, to be precise firstly by a central stop 34 which enters the movement path of the boxes 10 as a transverse web which can move up and down and determines the end position of the second box 10. At the end of the box receptacle 32 or the roller track 33, a likewise movable end stop 35 is provided as a stop for the box 10 which was conveyed onto the box receptacle 32 first.

Figure 4:
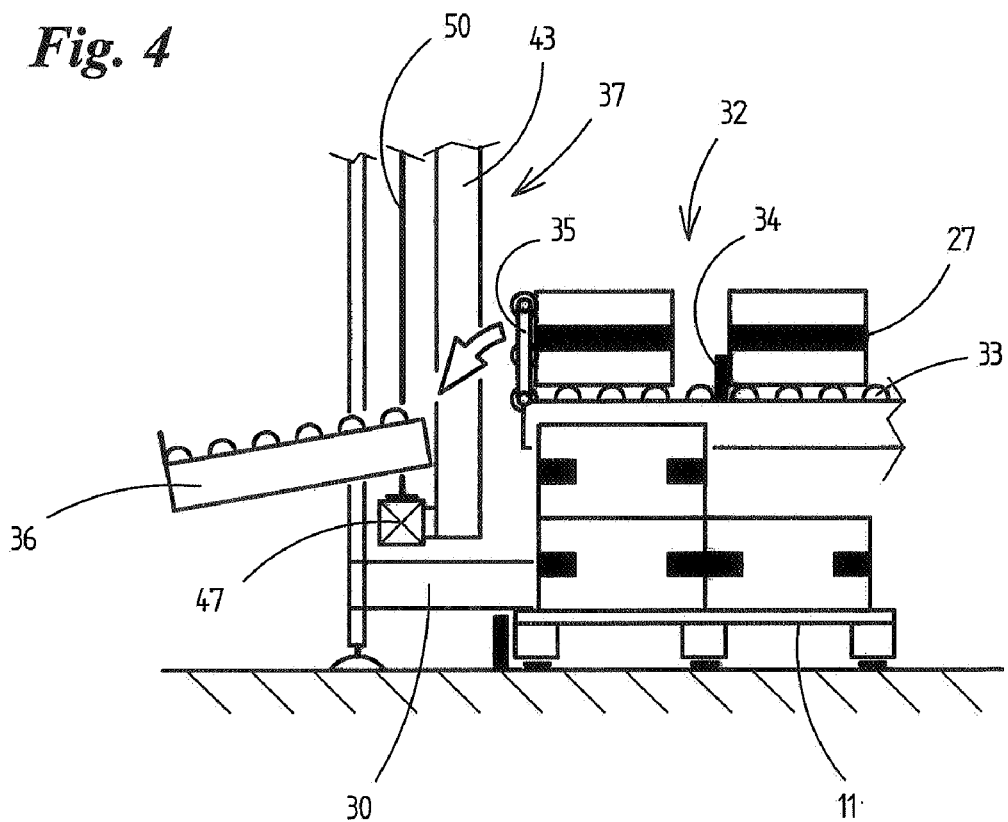
FIG. 4 shows a detail from FIG. 3 in the region of a palleting station according to detail IV from FIG. 3, on an enlarged scale.
Figure 5:
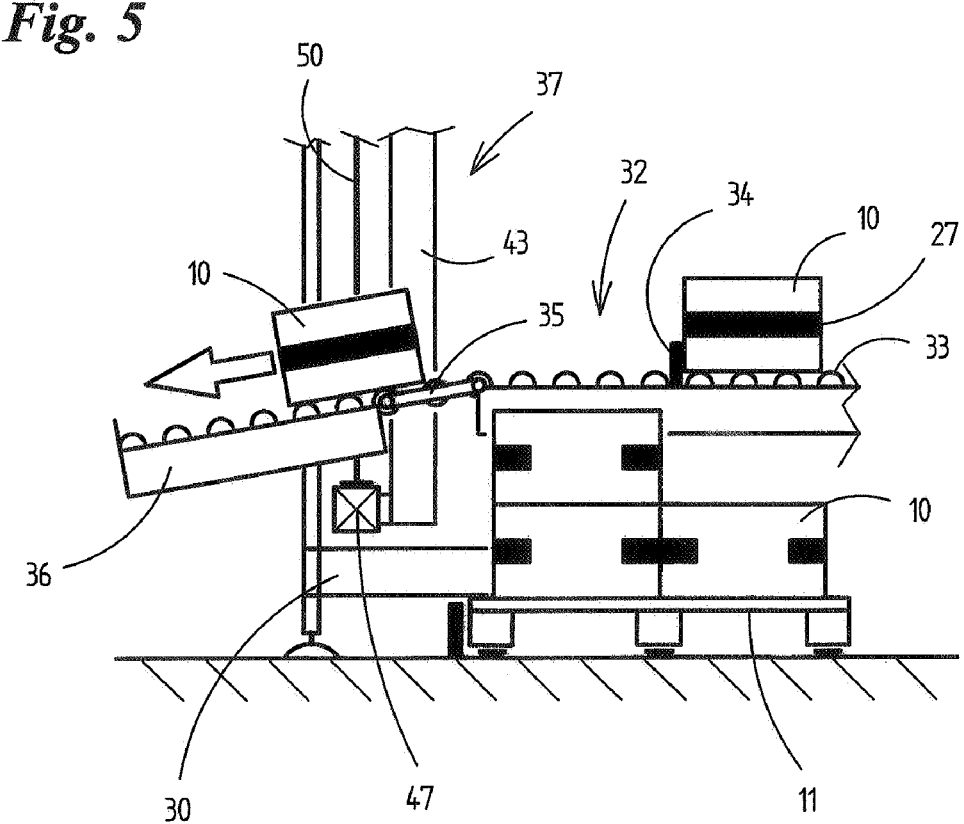
FIG. 5 shows the detail according to FIG. 4 in the case of a changed function of the device.

The end stop 35 is configured in a special way and has a dual function. It is a track piece, namely a pivotable section of the roller track 33. In its function as an end stop 35, said track section is oriented upward (FIG. 4). In another position (FIG. 5), the end stop 35 forms a continuation of the box receptacle 32 or of the roller track 33, to be precise as a bridge to a discharge conveying path 36. The latter is likewise configured as a roller track here and is oriented obliquely downward. In conjunction with the end stop 35 which is configured as a track, the discharge conveying path 36 opens up the possibility of conveying boxes through the palleting station 29, for example identified faulty packs or in the case of temporary operational interruption of the palleting station 29.

The palleting station 29 is oriented transversely with respect to the packing station 21 and the closing station 25 during the execution of the main function. A lifting conveyor, namely a portal robot 37, in each case grips a box 10 in the region of the box receptacle 32. A pallet 11 is loaded by raising, transverse movement and depositing on the pallet 11 next to the box receptacle 32.

For handling the boxes 10 in the region of the palleting station 29, the portal robot 37 is configured in a special way with regard to construction and function. A lifting head 38, in particular a suction head, grips in each case one box 10 on its upper side. The lifting head 38 is attached to a carrying arm 39 which is mounted as a projecting arm on a supporting framework. The carrying arm 39 extends over the full width of a basic surface area of the palleting station 29 defined by the pallets 11. The lifting head 38 can be moved with a moving mechanism 40 in the longitudinal direction of the carrying arm 39. Furthermore, the lifting head 39 is attached to a vertical carrying rod 42 which can be rotated by the motor 41, with the result that the boxes 10 which are gripped by the lifting head 38 can be rotated about a vertical axis.

The carrying arm 39 is mounted such that it can move up and down, to be precise on a vertical loadbearing column 43. For this purpose, the carrying arm 39 is attached to a moving frame 44 which can be displaced on the loadbearing column 43, to be precise by a motor 45 via an (endless) pulling member such as a toothed belt. The carrying arm 39 is connected to the moving frame 44 via a special supporting framework, namely by means of the corner component 46, in order to transmit the loads of the carrying arm 39 which act on one side to the moving frame 44 and therefore to the loadbearing column 43 without problems.

For its part, the vertical loadbearing column 43 can be displaced in the horizontal direction, to be precise along a rectilinear movement path next to the pallets 11 which are to be loaded. On one longitudinal side of the rectangular palleting station 29, a lower carrying beam 47 and an upper carrying beam 48 are attached in a stationary manner, in particular by connection (not shown) to the machine frame, for example to longitudinal carriers of the palleting station 29. The loadbearing column 43 is connected to the lower carrying beam 47 and the upper carrying beam 48 in such a way that the loadbearing column 43 can be displaced on the two carrying beams 47, 48. In the case of a vertical position of the end stop 35, the portal robot 37, namely the loadbearing column 43, can be displaced as far as the region of the box receptacle 32.

A motor 49 which is arranged on the upper carrying beam 48 serves for driving, which motor 49 drives a drive means within the (hollow) carrying beam 48 and a drive member in the lower carrying beam 47 via a vertical shaft 50. Here, these are preferably in each case belts, in particular toothed belts, which extend within the carrying beams 47, 48 over their length and to which a guide is attached which is connected to the loadbearing column 43 and can be displaced with the latter. Each box 10 can be gripped on the box receptacle 32 and deposited in a desired position on the pallet 11 by means of the lifting conveyor or portal robot 37 which is configured in this way, with short transport paths. As can be seen, the boxes 10 are positioned one above another in a plurality of layers on a pallet.

Figure 2:
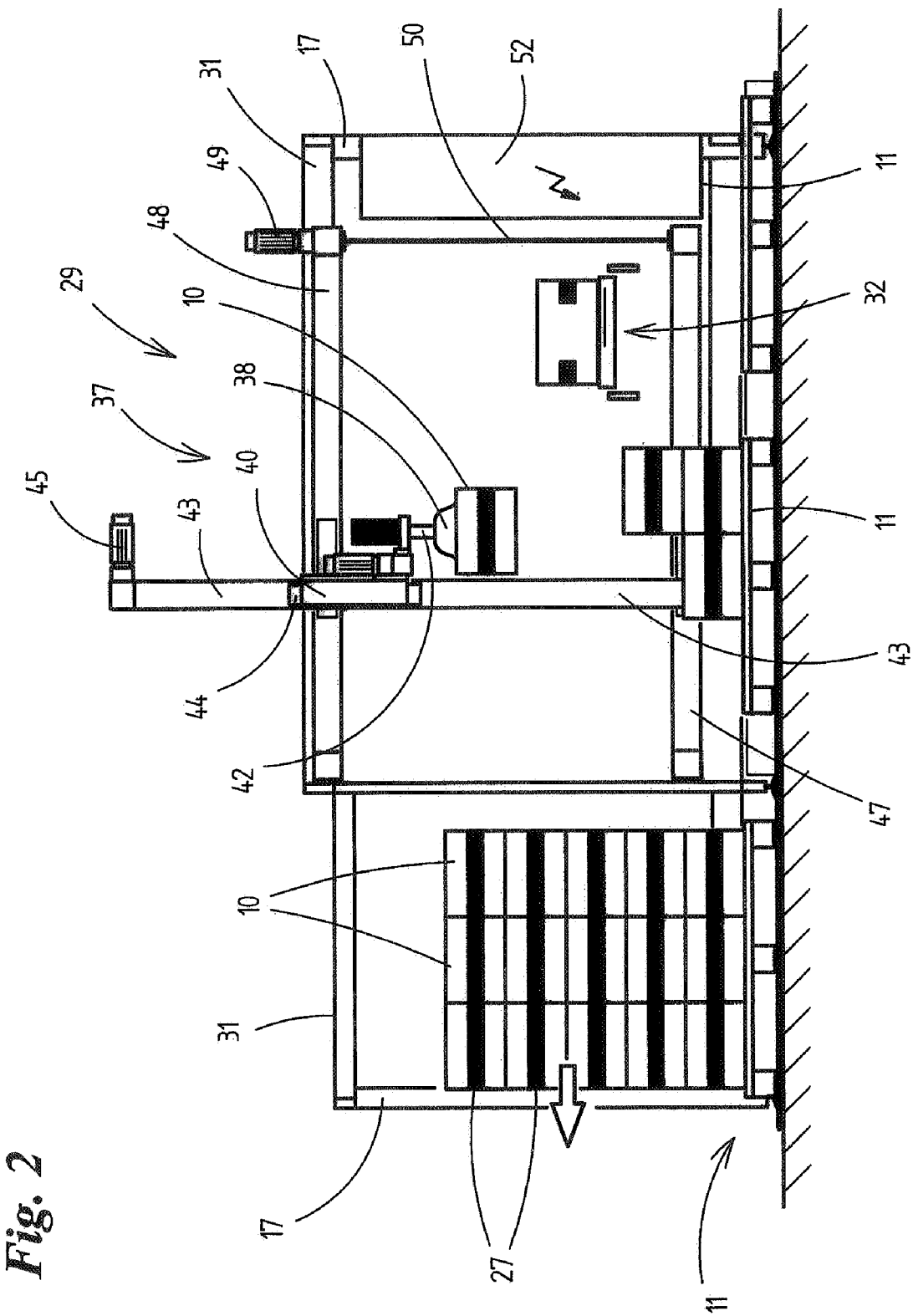
FIG. 2 shows the device according to FIG. 1. in a transverse view corresponding to the plane II-II in FIG. 1.
Figure 3:
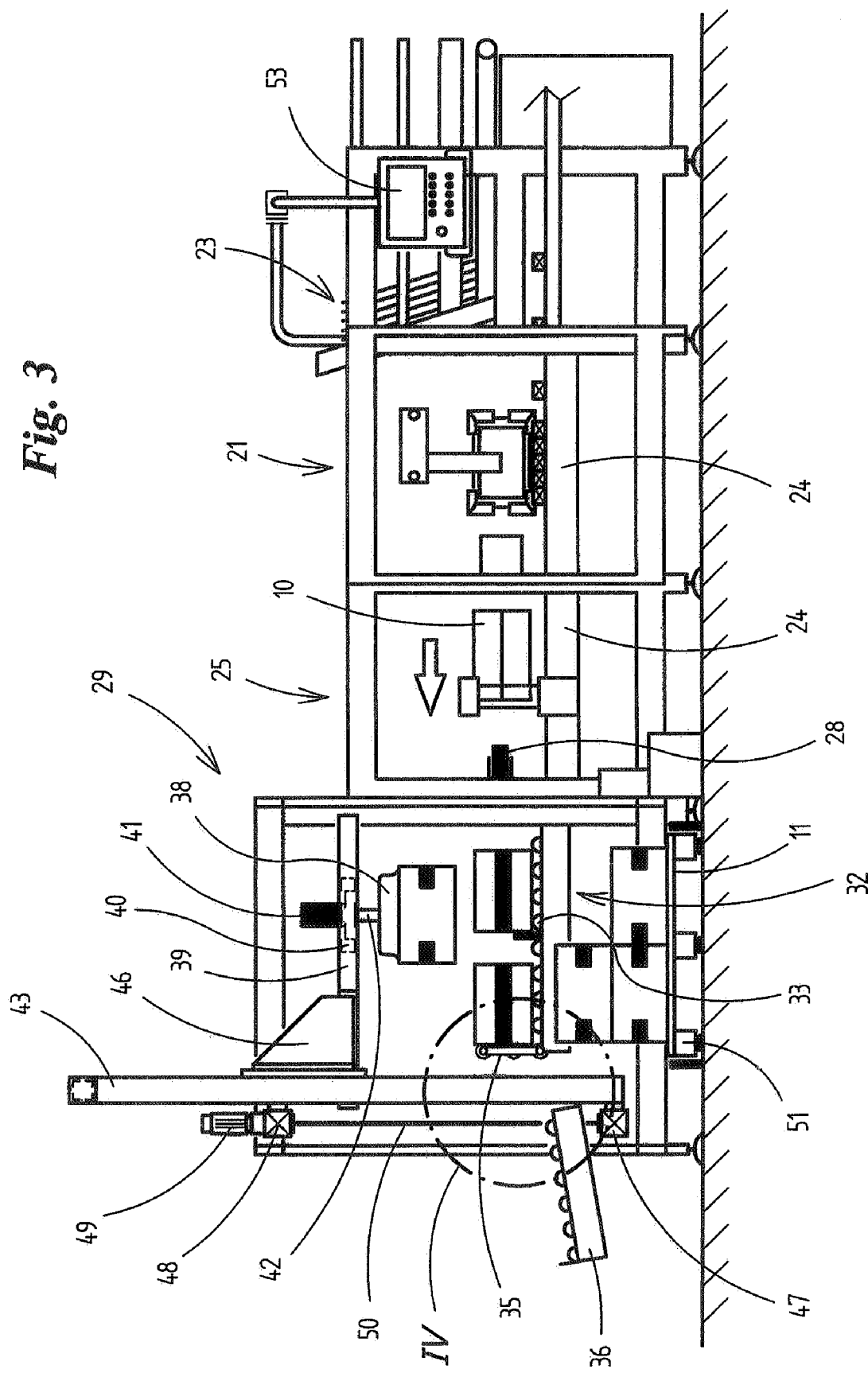
FIG. 3 shows a side view of the overall device according to the sight plane III-III in FIG. 1.

The pallets 11 are fed and kept available in a plane which is offset downward with respect to the conveying and provision plane of the boxes 10. The empty pallets 11 are introduced into the region of the palleting station 29 on one side (on the left in FIG. 1) on rail-like underlying surfaces 51, and are displaced below the box receptacle 32 into a loading position next to the box receptacle 32. The dimensions are selected in such a way that a further empty pallet 11 is kept ready (FIG. 2) next to the pallet 11 in the loading position. The loaded pallet is subsequently transported further from the loading position in the same movement direction (arrows) out of the region of the palleting station 29, in particular for being received by a suitable transport unit (not shown).

The device is distinguished by a compact construction, in particular also by the L-shaped or U-shaped layout. The units which are combined to form one, common device are connected to a common controller, in particular also to a common switch cabinet 52 for the electrical and electronic control units. The entire device can be operated by a common control device 53 having a display screen. The control device 53 can be a standard (industrial) PC which controls the functions of the part assemblies of the device.

LIST Of DESIGNATIONS

10 Boxes
11 Pallet
12 Bundle pack
13 Feed conveyor
14 Box packer
15 Longitudinal carrier
16 Crossmember
17 Supports
18 Grouping station
19 Pack group
20 Slide
21 Packing station
22 Folding tabs
23 Blank magazine
24 Conveyor
25 Closing station
26 Folding members
27 Adhesive tapes
28 Tape guide
29 Palleting station
30 Longitudinal carrier
31 Crossmember
32 Box receptacle
33 Roller track
34 Stop
35 End stop
36 Discharge conveying path
37 Portal robot
38 Lifting head
39 Carrying arm
40 Moving mechanism 41 Motor
42 Carrying rod
43 Loadbearing column
44 Moving frame
45 Motor
46 Corner component
47 Carrying beam
48 Carrying beam
49 Motor
50 Shaft
51 Underlying surface
52 Switch cabinet
53 Control device

The invention claimed is:

1. A device for producing and making ready for dispatching cardboard packaging made from folded boxes (10), each for a plurality of bundle packs (12), formed as a pack group (19), which are filled into a laterally-open folding box (10), the filled folding box (10) being fed to a downstream closing station (25) and subsequently to a palleting station (29) for transfer to a pallet (11), characterized by the following features:

a) a grouping station (18), a packing station (21), the closing station (25) and a box receptacle (32) in a region of the palleting station (29) are arranged in a common horizontal plane, b) the grouping station (18) is arranged adjacent to the packing station (21) such that the pack group (19) is pushed by transversely-displaceable slides (20) into the laterally-open folding box (10) which is held ready in the packing station (21), c) the filled box (10) is transported to the following closing station (25) along a rectilinear movement path, wherein during transport laterally directed box folding tabs (22) are folded in a closed position and fixed by adhesive tapes (27), d) the finished boxes (10) are conveyed in continuation of the movement path to the box receptacle (32) of the palleting station (29) and deposited, e) a pallet (11) to be loaded is positioned laterally adjacent to the box receptacle (32), f) a portal robot (37) with a lifting head (38) is moved in the region of the pallet (11) to be loaded and the box receptacle (32) for gripping a box (10) placed on the box receptacle (32) and depositing it on the adjacently located pallet (11), g) the portal robot (37) comprises an upright loadbearing column (43), which is displaceable in a direction transverse to the transporting direction of the boxes (10) in the region of the palleting station (29), h) the loadbearing column (43) is displaceable on a lower carrying beam (47) and an upper carrying beam (48), which are disposed laterally offset adjacent to the region of the box receptacle (32) and the pallet (11) to be loaded, and i) a transverse carrying arm (39) is movable up and down on the loadbearing column (43), and a lifting head (38) travels on the transverse carrying arm (39) along its longitudinal direction.

* * * * *